(12) United States Patent
Diehl

(10) Patent No.: US 8,724,808 B2
(45) Date of Patent: May 13, 2014

(54) METHOD FOR SECURE DISTRIBUTION OF DIGITAL DATA REPRESENTING A MULTIMEDIA CONTENT

(75) Inventor: Eric Diehl, Liffré (FR)

(73) Assignee: Thomson Licensing S.A., Cedex (FR)

( * ) Notice: Subject to any disclaimer, the term of this patent is extended or adjusted under 35 U.S.C. 154(b) by 1392 days.

(21) Appl. No.: 10/343,491

(22) PCT Filed: Jul. 31, 2001

(86) PCT No.: PCT/FR01/02502
§ 371 (c)(1),
(2), (4) Date: Jun. 4, 2003

(87) PCT Pub. No.: WO02/13529
PCT Pub. Date: Feb. 14, 2002

(65) Prior Publication Data
US 2004/0068659 A1 Apr. 8, 2004

(30) Foreign Application Priority Data
Aug. 4, 2000 (FR) ..................................... 00 10339

(51) Int. Cl.
*G06F 21/00* (2013.01)

(52) U.S. Cl.
USPC .......................................... 380/210; 380/282

(58) Field of Classification Search
USPC .............. 380/210, 282, 255; 726/19; 713/157
See application file for complete search history.

(56) References Cited

U.S. PATENT DOCUMENTS

| | | | | |
|---|---|---|---|---|
| 5,563,950 A | | 10/1996 | Easter et al. ..................... 380/30 |
| 6,035,397 A | * | 3/2000 | Campinos et al. .............. 380/28 |
| 6,230,269 B1 | * | 5/2001 | Spies et al. ..................... 713/182 |
| 6,804,357 B1 | * | 10/2004 | Ikonen et al. .................. 380/241 |
| 6,959,288 B1 | * | 10/2005 | Medina et al. .................. 705/51 |
| 7,010,685 B1 | * | 3/2006 | Candelore ...................... 713/164 |
| 7,080,039 B1 | * | 7/2006 | Marsh .............................. 705/51 |
| 7,305,087 B1 | * | 12/2007 | Ques et al. ..................... 380/207 |
| 2002/0094084 A1 | * | 7/2002 | Wasilewski et al. .......... 380/241 |

FOREIGN PATENT DOCUMENTS

| | | | | |
|---|---|---|---|---|
| EP | 586022 | 3/1997 | ................ H04L 9/32 |
| EP | 858184 | 8/1998 | ................ H04L 9/00 |
| EP | 0996074 A1 | 4/2000 | |

(Continued)

OTHER PUBLICATIONS

"Functional Model of a Conditional Access System" EBU Review—Technical, European Boradcasting Union, Brussels, BE, pp. 64-77.

*Primary Examiner* — Michael S McNally
*Assistant Examiner* — Carlton Johnson
(74) *Attorney, Agent, or Firm* — Robert D. Shedd; Paul P. Kiel

(57) ABSTRACT

A content server maintains a database of different content files, these files being scrambled by control words that are stored in a database. The control words are necessary for descrambling the content files. When a device requests a content file, it sends a public key to the content server, along with the request. The content server encrypts the control words with the public key and transmits both the ciphered control words and the scrambled content file to the device. In one embodiment, the device decrypts the control words, and, when a further device on the home network requests a content file, sends the scrambled content file, along with the necessary control words encrypted with a local key that may have been provided by the further device.

3 Claims, 3 Drawing Sheets

(56) References Cited

FOREIGN PATENT DOCUMENTS

| | | |
|---|---|---|
| EP | 1078510 B1 | 2/2003 |
| JP | 10-178629 A | 6/1998 |
| JP | 11-112494 A | 4/1999 |
| JP | 11-143953 A | 5/1999 |
| JP | 11-328850 A | 11/1999 |
| JP | 2000-78555 A | 3/2000 |
| JP | 2000-113048 A | 4/2000 |
| JP | 2000-151526 A | 5/2000 |
| KR | 19970068618 | 10/1997 |
| WO | 97/04553 | 2/1997 ............... H04L 12/22 |
| WO | 99/07149 | 2/1999 ............... H04N 7/16 |
| WO | WO 9941874 A1 * | 8/1999 |
| WO | 99057889 A1 | 11/1999 |
| WO | WO 0062505 A1 * | 10/2000 |

* cited by examiner

METHOD FOR SECURE DISTRIBUTION OF DIGITAL DATA REPRESENTING A MULTIMEDIA CONTENT

This application claims the benefit, under 35 U.S.C. §365 of International Application PCT/FR01/02502, filed Jul. 31, 2001, which was published in accordance with PCT Article 21(2) on Feb. 14, 2002 in French and which claims the benefit of French patent application No. 0010339 filed Aug. 4, 2000.

FIELD OF THE INVENTION

The present invention pertains in a general manner to the distribution of data through broadcasting networks, in particular the Internet network. It relates more especially to a method of secure distribution of digital data representative of a multimedia content, such as video or audio sequences.

BACKGROUND ART

The existing solutions for distributing digital data in a secure manner, by way of the Internet network in particular, are based essentially on the encryption of the data transmitted by the content provider and the decryption of these data by an application executed on a computer connected to the network and receiving the said data.

However, these solutions do not guarantee sufficient security since it is almost impossible to securely store a decryption key (which must remain secret in order to guarantee security) in an appliance such as a computer.

Moreover, an important preoccupation of content providers relates to the anticopy protection of the digital data representing these contents.

DESCRIPTION OF THE INVENTION

An aim of the invention is therefore to propose a method of distribution of digital data representative of a multimedia content which is safer than those of the prior art.

Another aim of the invention is to propose such a method which furthermore makes it possible to avoid illicit copying of the digital data.

The invention relates accordingly to a method of secure distribution of digital data representative of a multimedia content by a content provider through a broadcasting network, the data being scrambled by control words. According to the invention, the method comprises the steps consisting in:
(a) encrypting the control words with the aid of an encryption key received from a content reception device connected to said network; and
(b) transmitting to said content reception device:
the scrambled digital data; and
the control words encrypted with the aid of the encryption key of said content reception device.

According to an advantageous embodiment of the invention, the encryption key is a unique public key associated with the content reception device.

A public key, used in an asymmetric cryptographic system, can be transmitted through a non secure network since only the private key associated therewith makes it possible to decrypt the control words encrypted with the public key. Thus, it is not necessary to provide a secure channel for transmitting the public key of the reception device.

According to a particular characteristic of the invention, the aforesaid method comprises the steps, prior to steps (a) and (b), consisting in receiving the public key of the reception device and a cryptographic certificate associated with the public key; and verifying the validity of the public key by analyzing the associated cryptographic certificate. Step (a) is performed only in case of positive verification.

According to another advantageous embodiment of the invention, the aforesaid method comprises the steps, prior to steps (a) and (b), consisting in:
scrambling the digital data with the control words;
storing in a database associated with said content provider:
the scrambled digital data; and
the control words used to scramble the data.

Thus, the content provider performs the preprocessing consisting in scrambling the digital data before receiving requests for transmission of data by content reception devices. When such requests are received by the content provider, the latter must just perform the encryption of the control words with the aid of the key received from the reception device which issued the request. This encryption calculation can be performed in real time at the moment of the downloading of the scrambled digital data to the reception device through the broadcasting network, thereby allowing fast processing of the request.

According to a particular characteristic of the invention, the control words are stored in the database associated with the content provider by being enclosed in control messages and:
in step (a), the control messages are encrypted with the aid of the encryption key received from the reception device; and
in step (b), the encrypted control messages are transmitted to the content reception device.

The invention also relates, according to a second aspect, to a method of secure distribution of digital data representative of a multimedia content to a content reception device through a broadcasting network, the digital data being scrambled by control words. According to the invention, the method comprises the steps consisting for said content reception device connected to the network in:
(i) transmitting to the content provider an encryption key associated with said content reception device;
(j) receiving from the content provider:
the scrambled digital data; and
the control words encrypted with the aid of said key;
(k) decrypting the control words received with the aid of a decryption key associated with the encryption key of the reception device; and
(l) descrambling, with the aid of the decrypted control words, the digital data so as to transform them into a signal able to be presented to a user.

According to an advantageous embodiment, the encryption key is a unique public key and the decryption key is the unique private key associated with said public key.

According to a particular characteristic of the invention, the content reception device is able to cooperate with a security element, and the public and private key pair is associated in a unique manner with the security element and is stored in said security element.

According to another characteristic of the invention, the security element is provided to the user of the content reception device by a trusted authority. The security element contains, in addition to the unique public and private key pair, a cryptographic certificate delivered by said authority and, in step (i), the content reception device transmits the associated cryptographic certificate to the content provider, in addition to the public key.

According to an advantageous characteristic of the invention, the security element is a detachable element, in particular a smart card.

The invention also relates, according to a third aspect, to a method of secure distribution of digital data representative of a multimedia content to a content receiver device, the device being adapted to be connected on the one hand to a broadcasting network, in particular the Internet network; and on the other hand to a digital home network, and the digital data being scrambled by control words. According to the third aspect of the invention, the method comprises the steps consisting for the reception device in:

(A) transmitting, via the broadcasting network, to the content provider a public key associated with the home network;

(B) receiving, via the broadcasting network, from the content provider:
the scrambled digital data; and
the control words encrypted with the aid of the public key of the home network;

(C) transmitting, via the digital home network, the scrambled data and the encrypted control words to a presentation device connected to the digital home network, said device being able to:
decrypt the control words with the aid of the private key associated with the public key of the home network; and
descramble, with the aid of the decrypted control words, the digital data so as to transform them into a signal able to be presented to a user.

According to an advantageous embodiment, the content reception device is able to cooperate with a first security element, and the public key associated with the home network is stored in this first security element.

According to this embodiment, the presentation device is able to cooperate with a second security element, and the private key associated with the home network is stored in this second security element.

According to an advantageous characteristic of the invention, the first security element and/or the second security element is a detachable element, in particular a smart card.

BRIEF DESCRIPTION OF THE DRAWINGS

The invention will be better understood on reading the following description of particular, nonlimiting embodiments thereof given with reference to the appended drawings in which.

DETAILED DESCRIPTION OF EMBODIMENTS OF THE INVENTION

In the subsequent description, reference will be made solely to digital data representing a video content but naturally, the invention applies to the distribution of any type of multimedia content, be it sequences of audio, video or textual data or even computer data files used for the implementation of software.

Figure 1:
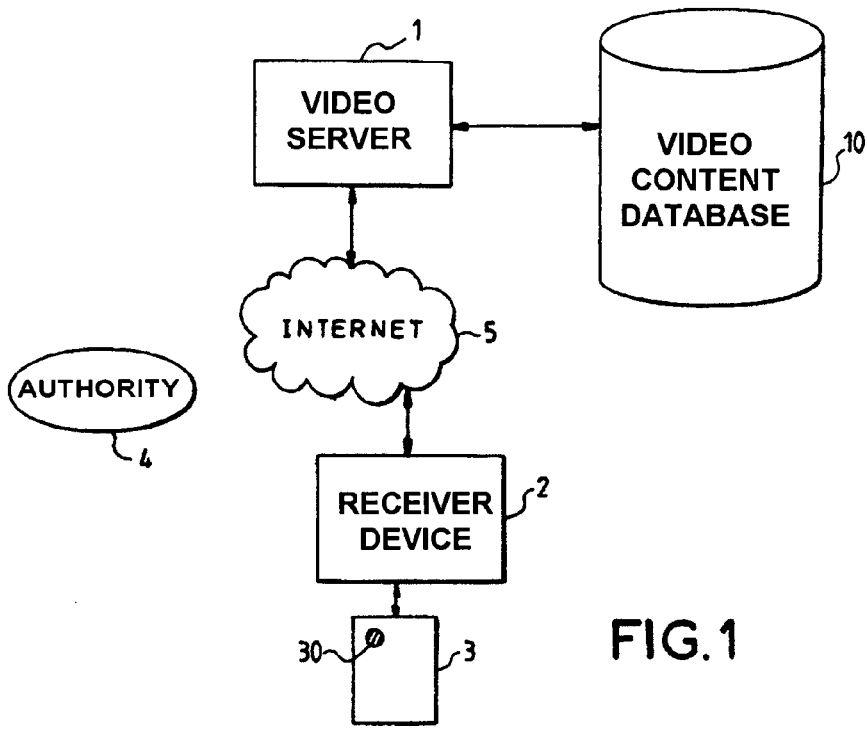
FIG. 1 is a diagram in the form of functional blocks of the various elements allowing the implementation of a first embodiment of the invention.

Represented in FIG. 1 is a video server 1 linked to a video contents database 10. These elements are those of a content provider who supplies users with video contents by way of a broadcasting network such as the Internet network 5.

The digital data representing the video contents are stored in the database in a form which is compressed (so as to be able to be transmitted easily by way of the broadcasting network) and scrambled by control words generally denoted CW. This scrambling is performed according to a symmetric cryptographic scheme with keys, the control words, which are periodically renewed and which are stored in control messages denoted ECM (standing for "Entitlement Control Message"). These control messages are stored, together with the scrambled data, in the database.

This preprocessing consisting in compressing and scrambling the data so as to store them in the database 10 is preferably performed before supplying the data to the users. It may even be performed outside of the database or of the video server.

The scrambling of the data is preferably performed according to the DVB CS standard (the initials standing for "Digital Video Broadcasting Content Scrambling") and the data are, in a preferred embodiment, coded in the form of packets according to the MPEG 2 standard (ISO/IEC 13818-1) so as to be transmitted over the broadcasting network.

Figure 2A:
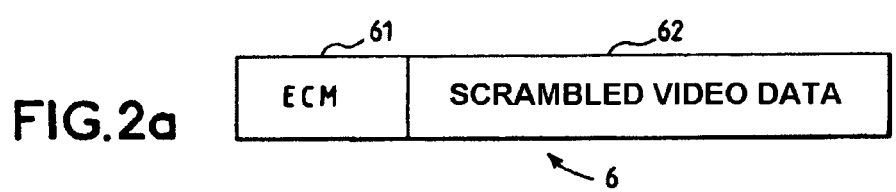
FIGS. 2a and 2b diagrammatically illustrate data which are exchanged by elements of FIG. 1.

Represented diagrammatically in FIG. 2a is the content of a data packet 6 such as it is stored in the database 10. This data packet comprises scrambled video data 62 and an ECM control message 61 which contains the control word CW used to scramble the data 62. Naturally, a complete video sequence is stored in the database in the form of a succession of packets of the type of the packet 6 of FIG. 2a. It will also be noted that generally, the ECM messages containing the control words which have served to scramble digital data are transmitted in advance, in the data stream, with respect to the data scrambled with these control words.

Coming back to FIG. 1, the video server 1 comprises means for sending or receiving messages or data to or from the Internet network 5. It also comprises means for encrypting the ECM messages before transmitting them over the network as will be seen hereinbelow.

A receiver device 2 is also linked to the Internet network. This receiver device is generally located at a user's who wishes to access video programs via the Internet network. It may in particular be a computer or a digital decoder (or "Set-Top Box"). The latter possesses a user interface (of the keypad, screen, remote control type, etc.) so as to allow in particular a user to select video programs which he wants to receive.

The receiver device also comprises means for receiving data streams from the Internet network, by streaming, that is to say by viewing the content as and when it is loaded, or by downloading, that is to say without viewing the content in real time.

It also comprises a descrambler capable of descrambling as will be seen hereinbelow, scrambled digital data packets which it receives, with the aid of the control words which served to scramble the data.

The receiver device 2 furthermore comprises a smart card reader intended for receiving a card 3. The smart card 3 comprises a secure processor 30 which, as is well known to the person skilled in the art, enables data such as cryptographic keys to be stored in a secure manner.

The smart card 3 is delivered preferably by a trusted authority 4 which may be dependent on or independent of the content provider. In order to be able to access the service for distributing video sequences by the content provider, a user must firstly subscribe to this service via the trusted authority designated by the content provider (for payment or otherwise depending on the content provider's commercial policy).

The user receives in exchange a smart card 3 which contains a unique private $K_{Pri\_Rec}$ and public $K_{Pub\_Rec}$ key pair specific to the card 3, that is to say that each smart card provided by the trusted authority comprises a different private/public key pair from that of the other cards provided by the same authority. The key pair is generated by the trusted authority 4 and the latter provides, associated with the public key, a cryptographic certificate.

Such a certificate contains a set of data (such as the public key, the user's identification, a date of validity of the public key) which prove that the public key does indeed belong to a given person and the certificate is signed by the trusted authority. The X509 (ISO/IEC 9594-8) standard will preferably be used to generate the certificate.

For example, the certificate may have the following form:
$K_{Pub\_Rec}$|User name|expiry date $K_{Pub\_Rec}$|signature
The signature being calculated as follows:

$$E_{K_{Pri\_Authority}}(\text{Hash}(K_{Pub\_Rec}|\text{User name}|\text{expiry date } K_{Pub\_Rec}))$$

with:
"|" representing the concatenation operation;
"Hash (x)" representing a hash function, that is to say a mathematical function which transforms a set of input data "x" into a set of data "y" of fixed size, often smaller than the size of the input data, and representative of the input data; this function being furthermore a one-way function, that is to say, knowing "y", it is impossible to retrieve "x" such that y=Hash(x); and
$E_K(M)$ represents the operation of encrypting the message M with the key K.

The smart card 3 preferably also contains means for establishing a payment protocol with a financial intermediary or directly with the content provider. The payment protocols, of micropayment type, that is to say dedicated to payments of small amounts, or of macropayment type, for bigger amounts, are well known to the person skilled in the art and will not be described hereinafter.

The smart card 3 also comprises means for decrypting the ECM messages which it receives with the aid of the private key $K_{Pri\_Rec}$ as will be seen hereinbelow.

In a general manner, the principle of the invention is as follows: when a user has selected a video sequence which he wants to receive from the video server 1 on his receiver device 2, the receiver device transmits, via the Internet network, the public key $K_{Pub\_Rec}$ as well as its certificate, both of which are stored in the smart card 3. The video server then verifies the validity of the public key by analyzing the certificate and, if the public key is valid, the video server encrypts the ECM messages containing the control words which served to scramble the corresponding video data sequence with the public key $K_{Pub\_Rec}$ received. That is to say, for each data packet 6 such as that of FIG. 2a, the plaintext ECM message 61 is replaced with an encrypted message $$E_{K_{Pub\_Rec}}(ECM)$$

Figure 2B:
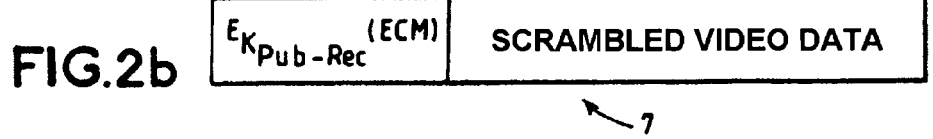

71 to form a data packet 7 (FIG. 2b) which contains the same scrambled data 72 as those 62 of the packet 6.

The data packets 7 containing the requested sequence of scrambled video data and the encrypted ECM messages are then transmitted to the receiver device by the video server.

The receiver device, when it receives these data, extracts the encrypted ECM messages therefrom and it transmits them to the smart card 3 which comprises means for decrypting the said messages with the aid of the private key $K_{Pub\_Rec}$ of the card. The decrypted ECM messages which contain the control words which served to scramble the video data are sent back to the receiver device by the card.

With the aid of these control words, and in a manner well known per se, the receiver device descrambles the digital data corresponding to the requested video sequence.

Figure 3:
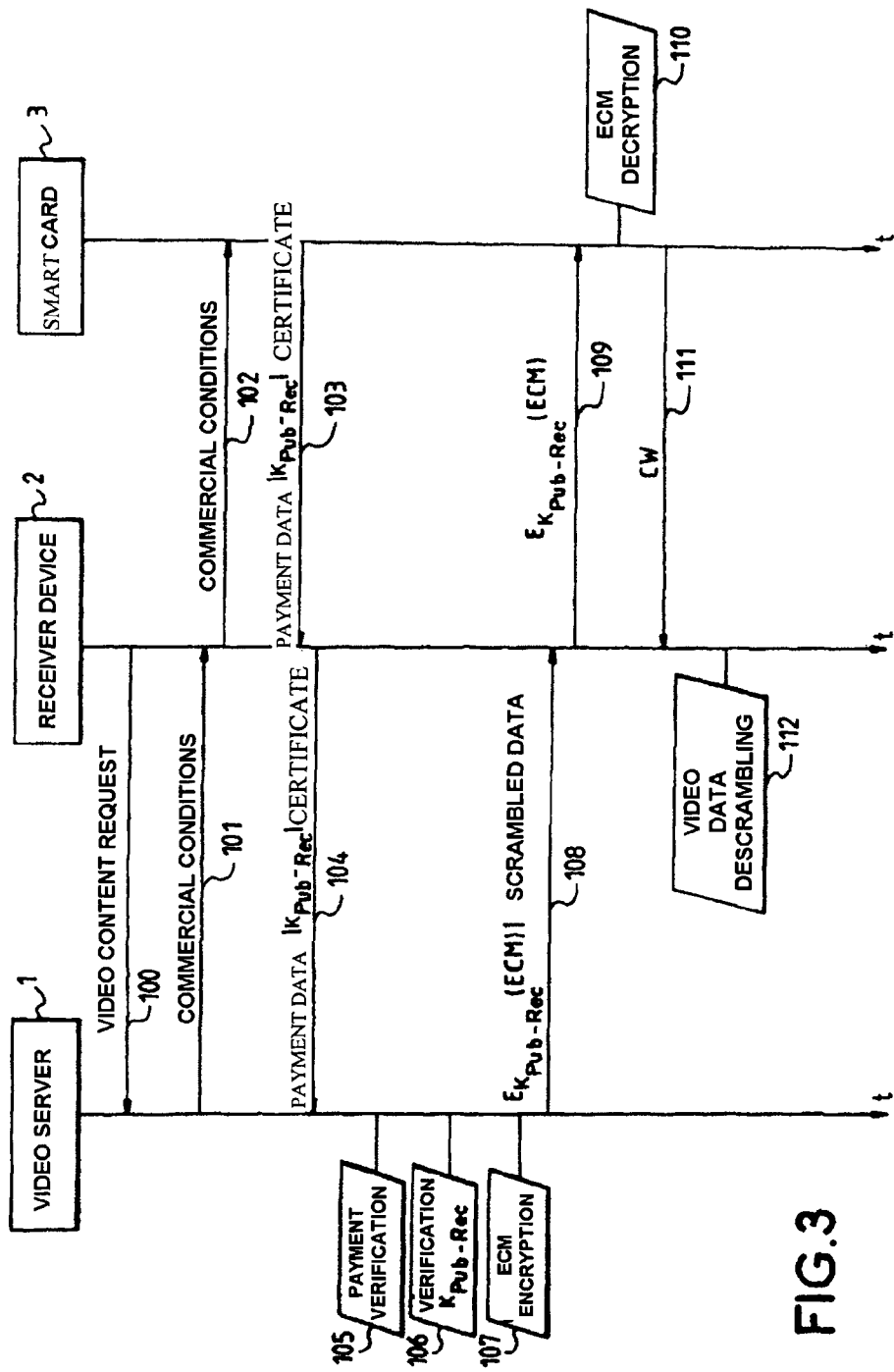
FIG. 3 illustrates the exchanges taking place between the main elements of FIG. 1 during the implementation of the method of the invention.

We shall now describe in more detail, in conjunction with FIG. 3, the various steps of the method of distributing data representative of multimedia contents of the invention.

Represented in FIG. 3 by three downward vertical axes t is the time axis to illustrate the exchanges between the video server 1, the receiver device 2 and the smart card 3 as well as the processing performed by these three elements.

During the first step 100, it is assumed that the user has selected, by way of the user interface of the receiver device, a video sequence, for example a film or a particular transmission, which he wants to receive. The receiver device 2 then constructs a video content request message which it issues to the address of the video server 1. This request naturally contains an identifier of the requested video sequence as well as an identifier of the receiver device.

In the next step 101, the video server sends back to the receiver device the commercial conditions, including the price, relating to the delivery of the chosen video sequence. These conditions are presented to the user by way of the user interface and the user then decides whether or not he wants to continue the transaction.

In the case where he still wants to receive the video sequence, the user signifies same by a command entered via the user interface and, in step 102, the receiver device sends the smart card 3 the commercial conditions received in step 101 or certain elements only, such as the price, of these conditions.

In fact, according to the chosen method of payment, the smart card might not be involved in the payment for the video sequence, for example in the case where a payment protocol based on a credit card is used (such as the SET protocol, the initials standing for "Secure Electronic Transaction"). We assume in the example of FIG. 3 that the smart card 3 is used for the payment for the chosen video sequence (for example the smart card comprises an "electronic purse" function implementing a micropayment protocol).

The smart card then sends, in step 103, to the receiver device, a message containing:
data relating to the payment;
the unique public key $K_{Pub\_Rec}$ stored in the card; and
the certificate associated with this public key.

This message is forwarded as is by the receiver device to the video server in step 104. In the case where the smart card is not involved in the payment, the data relating to the payment are concatenated by the receiver device with the data received from the smart card in the previous step so as to form the message transmitted in step 104.

The video server then proceeds to the verification of the data relating to the payment (step 105). If these data prove that the payment has indeed been made, then the server verifies the validity of the public key $K_{Pub\_Rec}$ by analyzing the certificate received with this key (step 106).

To do this, the server possesses the public key $K_{Pub\_Authority}$ of the trusted authority 4 which delivers the smart cards 3. It can therefore on the one hand verify the signature of the certificate by performing the operation:

$$D_{K_{Pub\_Authority}}\left(E_{K_{Pri\_Authority}}(\text{Hash}(K_{Pub\_Rec}|\text{User name}|\text{expiry date } K_{Pub\_Rec}))\right)$$

with

"$D_K(M)$" representing the operation of decrypting, with the key K, the message M and on the other hand perform the operation:

Hash ($K_{Pub\_Rec}$|User name|expiry date $K_{Pub\_Rec}$) with the aid of the other data of the certificate.

The above two operations should normally give the same result if the certificate has not been altered.

The server can thus verify that the public key $K_{Pub\_Rec}$ received from the receiver device is indeed that which was allocated by the trusted authority to the user who possesses the smart card 3.

Once this verification has been carried out, in the next step 107, the server encrypts, with the key $K_{Pub\_Rec}$, the ECM messages containing the control words used to scramble the data corresponding to the video sequence chosen by the user.

The RSA (from the name of the creators Rivest, Shamir and Adleman) cryptographic algorithm will preferably be chosen, this being well known to the person skilled in the art as using private and public keys (delivered by the trusted authority 4) with a size of 1024 bits.

In the next step 108, the server transmits (by downloading as seen earlier) the encrypted control messages and the scrambled data corresponding to the sequence chosen by the user.

The encrypted control messages are then extracted by the receiver device from the data received and are transferred by it to the smart card 3 in step 109.

In step 110, the smart card decrypts the control messages with its private key $K_{Pri\_Rec}$ and it returns the control words CW as plaintext to the receiver device (step 111).

The latter is then able, in step 112, to descramble the digital data received in step 108, with these control words. It can then present these data directly to the user so that he views them (for example in the case of a computer equipped with a screen). However, it may also transmit these data to another device for viewing.

As a variant, it is also possible for the smart card 3 to comprise a descrambler and for the descrambling of the digital data to be performed in the smart card.

We shall now describe a second embodiment of the invention which makes it possible furthermore to ensure protection against the copying of the distributed multimedia contents.

The elements in common with the embodiment of FIG. 1 bear the same reference numbers and will not be described further.

The first difference with the system of FIG. 1 is that the receiver device 20, in addition to being linked to the Internet network 5 for downloading data, is connected to a digital home network 50. Apart from this, the receiver device 20 comprises the same elements as the receiver device 2, in particular a smart card reader adapted to receive a card 21 delivered by the trusted authority 4.

On the other hand, the smart card 21 contains only a public key allocated by the trusted authority.

A second smart card 25 containing the private key associated with the said public key is also delivered to the user by the trusted authority but the latter is intended to be inserted into the card reader of a presentation device 24, also connected to the digital home network 50.

In the subsequent description, the public key contained in the card 21 will be regarded as being the public key $K_{PUB\_DHN}$ of the home network 50 and the private key contained in the card 25 will be regarded as being the private key $K_{PRI\_DHN}$ of the home network 50.

The principle of this embodiment is as follows: when a user wishes to receive a video sequence, steps 100 to 102 described in FIG. 3 take place in the same manner, following which, the public key of the home network $K_{PUB\_DHN}$ (stored in the smart card 21) is transmitted to the video server 1. The latter therefore encrypts the ECM control messages with the key $K_{PUB\_DHN}$ and returns these encrypted messages, with the scrambled data corresponding to the chosen video sequence, to the receiver device 20.

On the other hand, as the smart card 21 inserted into this device does not contain the private key $K_{PRI\_DHN}$, the receiver device 20 cannot descramble the data. Besides, preferably, the receiver device 20 does not comprise any descrambler.

This receiver device serves solely as point of entry onto the digital home network for receiving data from an external broadcasting network such as the Internet.

The digital data corresponding to the video sequence chosen by the user can therefore flow around the home network 50 while always being scrambled. They will only be descrambled in a presentation device 24 (for example a digital television) which comprises a smart card 25, containing the private key $K_{PRI\_DHN}$ of the home network 50, capable of decrypting the ECM control messages encrypted with the public key $K_{PUB\_DHN}$ of the home network.

Figure 4:
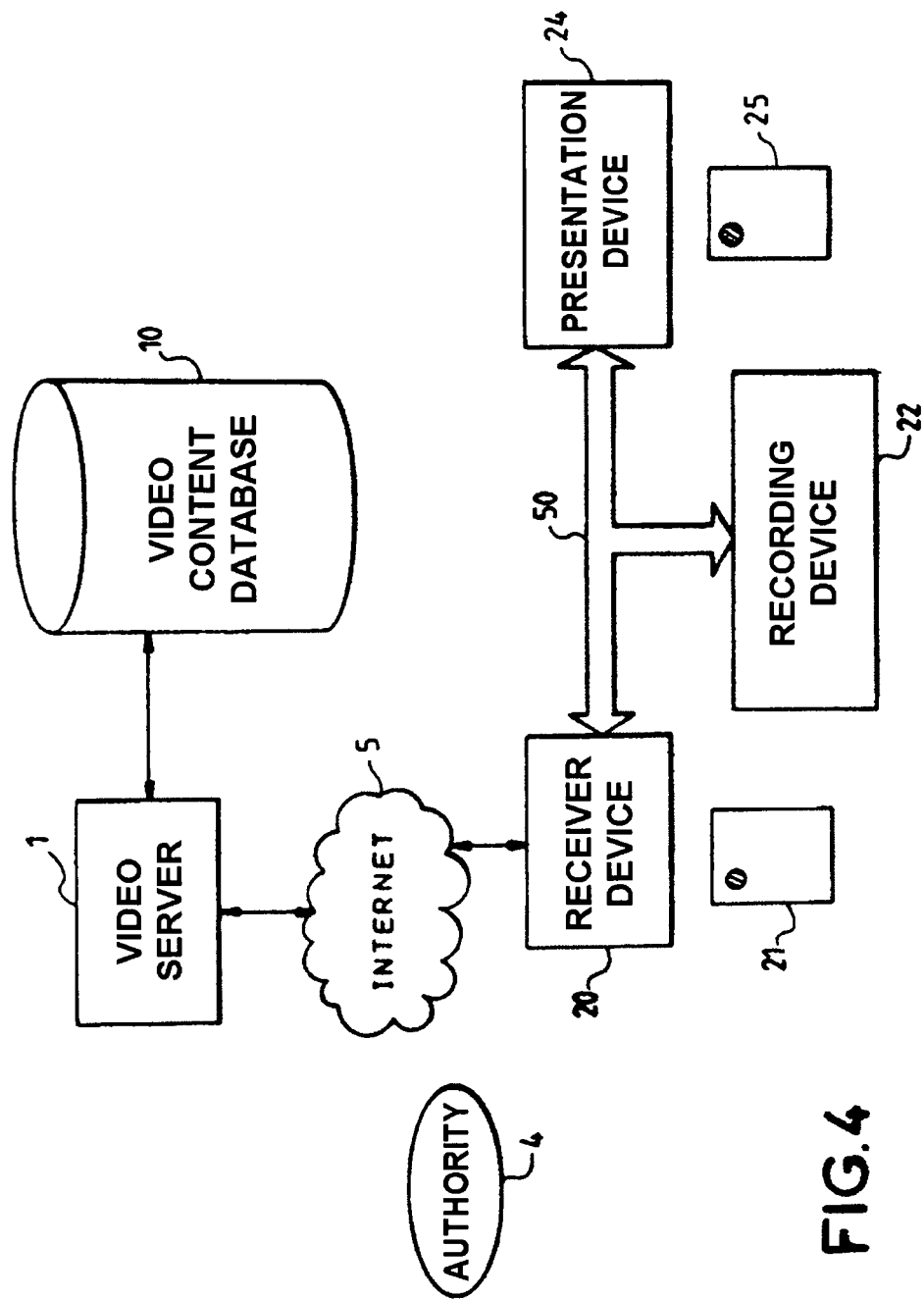
FIG. 4 is a diagram in the form of blocks illustrating a second embodiment of the invention.

Also represented in FIG. 4 is a recording device 22 connected to the digital home network 50. This device is in particular a digital video recorder or an appliance capable of recording optical discs, of the DVD type (the initials standing for "Digital Versatile Disc").

By virtue of the method of the invention, as the data which flow around the home network 50 are scrambled, they cannot be recorded by the recording device 22 other than in this form. It is thus possible to make copies of the data received from the content provider by downloading from the Internet network 5 but these copies can be read back only in the home network 50.

Specifically, as the ECM control messages associated with the scrambled data are encrypted with the aid of the public key of the home network $K_{PUB\_DHN}$, these messages can be decrypted only by the presentation device 24 connected to the home network 50.

The trusted authority 4 makes sure of course that the private/public key pairs (contained in the pairs of cards 21, 25) which it provides to the users are all different from one another and are unique. It is therefore impossible to read back a copy made on the home network 50 on another home network which possesses another private/public key pair.

The invention therefore makes it possible to guarantee that the data received from the content provider will not be copied illicitly so as to be read back outside of the user's home network.

Naturally, the home network 50 can comprise several receiver devices (which contain a smart card containing the public key $K_{PUB\_DHN}$), several presentation devices (which contain a smart card containing the private key $K_{PRI\_DHN}$) and several recording devices. The receiver devices are in particular a digital decoder or a juke-box (appliance capable of downloading Internet data but not of presenting them); the presentation devices are in particular a digital television or loudspeakers capable of receiving a digital signal. It is also possible for an appliance to fulfil the function of receiver and of presentation device at one and the same time, the important thing being that the data always flow around the home network in scrambled form guaranteeing effective protection against illicit copying.

The invention claimed is:

1. Method of secure distribution of digital data by a content provider through a broadcasting network, wherein the content provider performs the method comprising the steps of:
   storing digital data scrambled by control words, and the control words used to scramble the digital data in a database associated with the content provider;
   receiving, via a broadcast network, a request for an item of digital data from a content receiver device;
   receiving, via the broadcast network, a unique public key being specific to one of a plurality of users in the broadcast network of the content receiver device and a cryptographic certificate associated with said public key from content receiver device;
   verifying the validity of the public key by analyzing the associated cryptographic certificate; and
   encrypting the control words using the encryption key received from the content receiver device connected to said broadcast network to obtain encrypted control words, wherein the step of encrypting the control words being performed only in case of positive verification of the public key; and
   transmitting, via said broadcast network, to said content receiver device:
      the scrambled digital data; and
      the encrypted control words.

2. Method according to claim 1, wherein the control words are stored in the database by being enclosed in control messages and wherein:
   said control messages are encrypted with the aid of the encryption key received from the receiver device; and
   the encrypted control messages are transmitted to the content receiver device.

3. The method of claim 1, wherein the digital data is scrambled before reception of the encryption key.

* * * * *